(12) United States Patent
Kitamura et al.

(10) Patent No.: US 7,759,108 B2
(45) Date of Patent: Jul. 20, 2010

(54) METHOD FOR PRODUCING FERMENTED MILK CONTAINING ANGIOTENSIN CONVERTING ENZYME INHIBITORY PEPTIDE AND METHOD FOR PRODUCING WHEY

(75) Inventors: Shuji Kitamura, Kanagawa (JP);
Takashi Ueyama, Kanagawa (JP)

(73) Assignee: Calpis Co., Ltd., Tokyo (JP)

( * ) Notice: Subject to any disclaimer, the term of this patent is extended or adjusted under 35 U.S.C. 154(b) by 627 days.

(21) Appl. No.: 11/558,998

(22) Filed: Nov. 13, 2006

(65) Prior Publication Data

US 2007/0087082 A1    Apr. 19, 2007

Related U.S. Application Data

(63) Continuation of application No. 10/719,173, filed on Nov. 20, 2003, now abandoned, which is a continuation of application No. 09/889,313, filed as application No. PCT/JP00/00068 on Jan. 11, 2000, now abandoned.

(30) Foreign Application Priority Data

Jan. 11, 1999 (JP) .................................... 11/3946

(51) Int. Cl.
    C12N 1/20 (2006.01)
(52) U.S. Cl. .................................. 435/252.9
(58) Field of Classification Search ................... None
    See application file for complete search history.

(56) References Cited

U.S. PATENT DOCUMENTS

| | | | |
|---|---|---|---|
| 3,846,560 A | 11/1974 | Hempenius et al. | |
| 3,876,806 A | 4/1975 | Hempenius et al | |
| 4,107,334 A | 8/1978 | Jolly | |
| 4,293,571 A | 10/1981 | Olofsson et al. | |
| 4,585,757 A | 4/1986 | Pang et al. | |
| 4,687,739 A | 8/1987 | Sugisawa et al. | |
| 4,687,840 A | 8/1987 | Pang et al. | |
| 5,238,921 A | 8/1993 | Maruyama et al. | |
| 5,314,873 A | 5/1994 | Tomita et al. | |
| 5,409,718 A | 4/1995 | Klaver et al. | |
| 5,418,218 A | 5/1995 | Wilber | |
| 5,449,661 A | * 9/1995 | Nakamura et al. | |
| 5,466,472 A | 11/1995 | Kuma et al. | |
| 5,486,461 A | 1/1996 | Nielsen | |
| 5,541,111 A | * 7/1996 | Yamamoto et al. | |
| 5,547,687 A | 8/1996 | Outinen et al. | |
| 5,618,689 A | 4/1997 | McCarthy et al. | |
| 5,656,268 A | 8/1997 | Sorodsky | |
| 5,695,796 A | * 12/1997 | Yamamoto et al. | |
| 5,766,940 A | 6/1998 | Yamamoto | |
| 6,214,585 B1 | 4/2001 | Kwon et al. | |
| 6,221,423 B1 | 4/2001 | Cho et al. | |
| 6,372,282 B1 | 4/2002 | Edens et al. | |
| 2002/0132288 A1 | 9/2002 | Swamylingappa et al. | |
| 2002/0182301 A1 | 12/2002 | Draaisma et al. | |
| 2003/0027769 A1 | 2/2003 | Scialdone et al. | |
| 2003/0040475 A1 | 2/2003 | Toba et al. | |
| 2003/0072863 A1 | 4/2003 | Hayasawa et al. | |

FOREIGN PATENT DOCUMENTS

| | | | |
|---|---|---|---|
| EP | 0 583 074 | | 2/1994 |
| EP | 583074 | * | 2/1994 |
| EP | 0 699 689 | | 3/1996 |
| JP | 03-120225 | | 5/1991 |
| JP | 07-075521 | | 3/1995 |
| JP | 2782153 | * | 7/1998 |
| WO | WO 99/16862 | | 4/1999 |
| WO | WO 01/68113 | | 9/2001 |
| WO | WO 01/68114 | | 9/2001 |

OTHER PUBLICATIONS

Yamamoto et al., (1994) "Antihypertensive Effects of Different kinds of Fermented Milk in Spontaneously Hypertensive Rats", *Biosci. Biotech. Biochem.*, 58(4)775-778.

Yamamoto et al., (1994) "Antihypertensive Effect of the Peptide Derived from Casein by an Extracellular Proteinase from Lactobacillus helveticus CP790", *Journal of Dairy Science*, 77:917-922.

Takano T., (1998) "Milk Derived Peptides and Hypertension Reduction", *Int. Dairy Journal*, 8:375-381.

Nakamura et al., (1995) "Rurification and Characterization of Angiotensin I-Converting Enzyme Inhibitors from Sour Milk", *Journal of Dairy Science*, 78:777-783.

Database WPI, Section Ch, Week 199433, Derwent Publications Ltd., 1994-268691, XP002236191.

(Continued)

*Primary Examiner*—Michael V Meller
(74) *Attorney, Agent, or Firm*—Fish & Richardson P.C.

(57) ABSTRACT

There are disclosed methods for producing fermented milk and whey that enable effective production in high yield of fermented milk and whey having high content of an ACEI peptide that is highly safe and applicable to pharmaceuticals, functional foods, health foods, and the like. The methods are: a method including the steps of mixing lactic acid bacteria and a starting material containing milk by stirring to prepare a mixed material, and fermenting the mixed material under stirring so that curd pieces and whey containing an angiotensin converting enzyme inhibitory peptide are generated, whereby fermented milk containing the curd pieces and the whey containing the angiotensin converting enzyme inhibitory peptide is produced; and a method including the steps of subjecting the resulting fermented milk to centrifugation and/or filter pressing to separate and recover whey.

8 Claims, No Drawings

OTHER PUBLICATIONS

Webster's Ninth New Collegiate Dictionary, 1990, p. 1159.

Biosciences and Industry, Susumu Maruyama, "Production of Hypotensive Peptides from Food Protein", 47 No. 11, 38-42, 1989. (with partial translation).

Japan Fermentation Engineering Society, Susumu Maruyama, et al. "Production of Peptide Inhibitors of the Renin-Angiotensin System from Maize Protein", p. 23, 1988.

Japanese Society for Bioscience, Biotechnology and Agrochemistry, Susumu Maruyama, et al, "Angiotensin Converting Enzyme Inhibitory Effect and Hypotensive Effect of Peptides from Repeat Sequence Region of Corn Seed Protein", p. 8, 1989.

Japan Nutrition and Food Society, Shinsuke Miyoshl, et al., "Hypotensive Effect of Enzymolytic Product of Maize Protein on SHR", p. 113, 1989.

Journal of Japan Agricultural Chemistry Society, Shinsuke Miyoshi, et al., "Angiotensin Converting Enzyme Inhibitory Effect of Peptides Derived from Maize Protein", 64(3), 555, 1990. (translation).

Antonie van Leeuwenhoek, "The Proteolytic Systems of Lactic Acid Bacteria," 70: 187-221. 1996.

* cited by examiner

METHOD FOR PRODUCING FERMENTED MILK CONTAINING ANGIOTENSIN CONVERTING ENZYME INHIBITORY PEPTIDE AND METHOD FOR PRODUCING WHEY

This application is a continuation of U.S. patent application Ser. No. 10/719,173, filed Nov. 20, 2003, which is a continuation of U.S. application Ser. No. 09/889,313, filed Jul. 11, 2001, which claims priority from International Application No. PCT/JP00/00068, filed Jan. 11, 2000, which claims priority from Japanese Application Serial No. JP 11/3946, filed January 1999, all of which are herein incorporated by reference.

FIELD OF ART

The present invention relates to a method for producing fermented milk containing an angiotensin converting enzyme inhibitory peptide which enables effective production of fermented milk containing an angiotensin converting enzyme inhibitory peptide such as Val-Pro-Pro and/or Ile-Pro-Pro, and to a method for producing whey containing an angiotensin converting enzyme inhibitory peptide which enables effective separation and production of whey containing an angiotensin converting enzyme inhibitory peptide.

BACKGROUND ART

Angiotensin Converting Enzyme (abbreviated "ACE" hereinbelow) is found mainly in lungs or vascular endothelial cells. ACE acts on angiotensin I (Asp-Arg-Val-Tyr-Ile-His-Pro-Phe-His-Pro-Phe-His-Leu), which has been generated by digestion with renin, to release a dipeptide (His-Leu) from its C-terminal, thereby giving angiotensin II, which causes contraction of vascular smooth muscle and has strong hypertensive effect. This enzyme also decomposes and inactivates bradykinin, which has hypotensive effect. Such ACE produces hypertensive peptide (angiotensin II) and at the same time inactivates hypotensive peptide (bradykinin), so that it exhibits hypertensive effect. Therefore, angiotensin converting enzyme inhibitor (abbreviated as ACEI hereinbelow), which inhibits activity of ACE, has hypertension inhibitory effect.

As ACEI, there are known peptides having three to ten amino acid residues including Val-Pro-Pro (Japanese Patent No. 2782142) and a tripeptide Ile-Pro-Pro (JP-A-3-120225). There is also known a peptide having ACEI activity, which is produced by digestion of milk casein by protease produced by lactic acid bacteria, and found in dissolved state in whey of fermented milk (J. Dairy Sci. 78, 6, p 1253-1257, 1995).

Such peptides as ACEI may be taken in the form of fermented milk per se containing Val-Pro-Pro and/or Ile-Pro-Pro. However, in view of the concentration and effective dose of the peptides as ACEI in the fermented milk, it is necessary to take a considerable amount of fermented milk. Thus, development of a method for producing fermented milk or whey containing a large amount of ACEI has been demanded.

It is known that ACEI such as Val-Pro-Pro and/or Ile-Pro-Pro is highly safe and thus can be used for pharmaceuticals, functional foods, health foods, and the like. For producing Val-Pro-Pro and/or Ile-Pro-Pro, there is proposed a method including the steps of culturing lactic acid bacteria in a medium containing peptides and/or proteins that have Val-Pro-Pro and/or Ile-Pro-Pro units to prepare fermented milk, and purifying the fermented milk (Japanese Patent No. 2782153).

Conventional lactic acid fermentation, for example for production of typical fermented milk products such as yogurt, is carried out by mixing starter bacteria and a starting material by stirring to form a uniform mixture, and then fermenting the mixture under static conditions in order to make the resulting product as a whole in the form of a curd. Such static conditions are believed to be required because, when a fermentation liquid is at reduced pH due to fermentative proliferation of lactic acid bacteria, application of vibration, such as by stirring or shaking, to such fermentation liquid will cause whey off and coarse texture of the resulting fermented milk products. Further, the lactic acid bacteria for the lactic acid fermentation are facultative anaerobic, so that their growth is often inhibited by oxygen. Accordingly, it has never been intended at all to effect culturing under stirring during the period where the lactic acid fermentation under static conditions is required. In cheese production, too, the fermentation is carried out by mixing starter bacteria and a starting material by stirring to form a uniform mixture, fermenting the mixture under static conditions, and then coagulating casein by the action of rennet under static conditions, after which the reaction mixture is stirred and pressed for removing whey.

Improvement in whey recovery is required for industrial purification of whey from fermented milk followed by concentration of its active components. A variety of methods for recovering the curd fraction from fermented milk have hitherto been proposed, but effective separation of whey from fermented milk has hardly been performed to date.

DISCLOSURE OF THE INVENTION

It is an object of the present invention to provide methods for preparing fermented milk and whey containing an ACEI peptide which enable effective production in high yield of fermented milk and whey having high content of an ACEI peptide that is highly safe and applicable to pharmaceuticals, functional foods, health foods, and the like.

According to the present invention, there is provided a method for producing fermented milk containing an ACEI peptide comprising:

(A) mixing lactic acid bacteria and a starting material containing milk by stirring to prepare a mixed material, and (B-1) fermenting said mixed material under stirring so that curd pieces and whey containing an ACEI peptide are generated, whereby fermented milk containing said curd pieces and said whey containing the ACEI peptide is produced.

According to the present invention, there is also provided a method for producing fermented milk containing an ACEI peptide comprising:

(A) mixing lactic acid bacteria and a starting material containing milk by stirring to prepare a mixed material, (B-1) fermenting said mixed material under stirring so that curd pieces and whey containing an ACEI peptide are generated, and (B-2) fermenting said mixed material under static conditions, whereby fermented milk containing said curd pieces and said whey containing the ACEI peptide is produced.

According to the present invention, there is further provided a method for producing whey containing an ACEI peptide comprising:

(A) mixing lactic acid bacteria and a starting material containing milk by stirring to prepare a mixed material, (B-1) fermenting said mixed material under stirring so that curd pieces and whey containing an ACEI peptide are generated, whereby fermented milk containing said curd pieces and said whey containing the ACEI peptide is produced, and subjecting the fermented milk to at least one of centrifugation and filter pressing to separate and recover whey.

According to the present invention, there is also provided a method for producing whey containing an ACEI peptide comprising:

(A) mixing lactic acid bacteria and a starting material containing milk by stirring to prepare a mixed material, (B-1) fermenting said mixed material under stirring so that curd pieces and whey containing an ACEI peptide are generated, (B-2) fermenting said mixed material under static conditions, whereby fermented milk containing said curd pieces and said whey containing the ACEI peptide is produced, and subjecting the fermented milk to at least one of centrifugation and filter pressing to separate and recover whey.

PREFERRED EMBODIMENT OF THE INVENTION

The present invention will now be explained in detail.

The present methods include the step of mixing lactic acid bacteria and a starting material containing milk by stirring to prepare a mixed material.

The milk as a starting material may be, for example, animal milk such as cow's milk, goat's milk, or sheep's milk; vegetable milk such as soy bean milk; or processed animal or vegetable milk such as skim milk, reconstituted milk, powdered milk, or condensed milk. These may be used as a mixture. Such milk contains peptides and proteins having Val-Pro-Pro and/or Ile-Pro-Pro units.

The solid content of the milk is not particularly limited. For example, when skim milk is used for production of fermented milk, the milk solid-non-fat content thereof is usually about 9 wt %. However, considering the productivity per facility, the milk solid-non-fat content is preferably raised to a certain degree in order to keep the production cost at a lower level. When the lactic acid fermentation under ordinary static conditions only is carried out at the milk solid-non-fat content of 13 wt % or higher, the viscosity of the resulting fermented milk becomes high, which will cause difficulties in separation of whey. Thus, the milk solid-non-fat content cannot be raised in the ordinary static fermentation. On the contrary, the methods of the present invention keep the resulting fermented milk at low viscosity even at the milk solid-non-fat content of 15 wt % or higher, since the fermentation in the present methods is accompanied by stirring as will be discussed later. Thus, whey can be obtained easily and efficiently.

In the methods of the present invention, the starting material may optionally contain other materials than milk as long as the object of the present invention is achieved. Such other materials may suitably be selected from the materials conventionally used in production of fermented milk, depending on the desired results.

The lactic acid bacteria used in the methods of the present invention are preferably those of the genus *Lactobacillus*. Examples of such lactic acid bacteria may include *Lactobacillus helveticus*, *Lactobacillus delbruekii* subsp. *bulgaricus*, *Lactobacillus acidophilus*, and the like. In particular, *Lactobacillus helveticus* CM4 (NATIONAL INSTITUTE OF BIOSCIENCE AND HUMAN TECHNOLOGY, AGENCY OF INDUSTRIAL SCIENCE AND TECHNOLOGY, Deposit No. FERM BP-6060, Deposition date: Aug. 15, 1997) (referred to as *Lactobacillus helveticus* CM4 hereinbelow) is preferred as ACEI peptide-productive lactic acid bacteria. *Lactobacillus helveticus* CM4 under the deposit number mentioned above has been accepted for deposit under the Budapest Treaty on the International Recognition of the Deposit of Microorganisms for the Purposes of Patent Procedure. All restrictions on the availability to the public of FERM BP-6060 will be irrevocably removed upon the granting of a patent.

In the present invention, the lactic acid bacteria are preferably in the form of a precultured starter having sufficient activity. The initial cell count of the starter is preferably about $10^5$ to $10^7$ cells/ml.

In the present invention, other microorganisms may optionally be added to the mixed material as long as the object of the present invention is achieved. For example, yeast may additionally be used for improving the flavor and palatability of the resulting fermented milk or whey as functional food, health food, and the like.

Strains of the yeast are not particularly limited, and for example, yeast of the genus *Saccharomyces* such as *Saccharomyces cerevisiae* may preferably be used. The content of the yeast may suitably be selected, depending on the desired result.

In the methods of the present invention, the mixing by stirring for preparing a mixed material may be conducted by a conventional method so that the lactic acid bacteria and the starting material are uniformly mixed. Incidentally, this mixing (A) is a conventional step, and distinguished from the fermentation step to be discussed later.

The methods of the present invention include (B-1) fermenting the mixed material under stirring so that curd pieces and whey containing an ACEI peptide are generated, or this fermenting (B-1) and (B-2) fermenting said mixed material under static conditions, whereby fermented milk containing the curd pieces and the whey containing the ACEI peptide is produced.

These steps are for lactic acid fermentation of the mixed material. Conventional lactic acid fermentation has been effected under static conditions so that the mixed material as a whole turns to a lump such as a curd.

In the methods of the present invention, the conditions of the lactic acid fermentation and the final acidity for terminating the fermentation may suitably be set optimally, taking the amount of the ACEI peptide to be generated into account, since the optimum conditions vary depending on the species and strains of lactic acid bacteria, as well as on the milk solid content. For example, when *Lactobacillus helveticus* CM4 is used, the optimum temperature is 25 to 40° C., and the duration of the fermentation is about 12 to 40 hours. The final acidity for terminating the fermentation is preferably about 1.5 to 3 wt % (weight percent of lactic acid).

In step (B-1), the fermentation is effected under stirring. When the lactic acid fermentation is effected only by step (B-1), the fermentation is effected under substantially continuous stirring. On the other hand, when the fermentation is effected by steps (B-1) and (B-2), each of the steps may be conducted at least once, and preferably conducted a plurality of times. In this case, the order of the steps is not particularly limited. The conditions for the stirring, and the conditions for the stirring and the standing may suitably be decided as long as a number of curd pieces and whey containing the ACEI peptide are generated in the fermentation step or steps. Preferably, such conditions may be decided so that the resulting mixture which contains the curd pieces and the whey containing the ACEI peptide has a viscosity of not higher than 20 cp, more preferably not higher than 10 cp. Here, the lower limit of the viscosity is not particularly imposed, but is usually about 2.0 cp. The generation of the curd pieces and whey can be achieved, for example, by setting the conditions so that the stirring is conducted while pH is lowered as the fermentation proceeds from about pH 5, at which soft curds are started to be generated, to pH 4.7-4.6, which is the isoelectric point of casein.

With the conventional fermentation only by stationary culture, curd is generated in the form of a plain-yogurt-like gel that is substantially contiguous all over the volume of a fermenter (tank). Such fermented milk curd cannot be made into a fermented milk of low viscosity as mentioned above by stirring the curd into pieces after the fermentation. On the contrary, with the methods of the present invention essentially including step (B-1), such a single curd bulk in the form of a contiguous gel is not generated, but curd pieces float, disperse, or precipitate in the whey. The size of the curd pieces may vary depending on various conditions and the kind of the lactic acid bacteria. For example, when the mixed material containing *Lactobacillus helveticus* CM4 is subjected alternately to the fermentation under stirring and the fermentation under static conditions, the size of the curd pieces will be about 3 μm to 5 mm.

In the present invention, the fermentation is preferably effected so that the growth of the lactic acid bacteria is not inhibited by excess oxygen, since the bacteria are facultative anaerobic. Accordingly, the stirring in the fermenting step is preferably carried out so that increase in the amount of oxygen is suppressed that is dissolved in the fermentation liquid due to entrainment of air bubbles therein. For example, the stirring, when continued all through the fermentation, is preferably carried out at low speed so that the fermentation liquid is softly mixed and fluidized. Specifically, the stirring speed may be about 1 to 50 rpm. Alternatively, when the fermentation is effected by a combination of fermentation under stirring and fermentation under static conditions, i.e., by a combination of steps (B-1) and (B-2), the stirring may be conducted vigorously for a short time to cause entrainment of air bubbles in the fermentation liquid, as long as increase in the amount of oxygen dissolved in the liquid is suppressed.

Surprisingly, by suitably selecting the above stirring conditions, the fermentation under stirring according to the present invention can provide fermented milk containing the ACEI peptide at the same ratio as or even higher ratio than the one produced only by the fermentation under static conditions, as demonstrated in the following Examples.

According to the method of the present invention, fermented milk that contains a large number of curd pieces and whey and that has a low viscosity and excellent workability, can be produced efficiently. Further, whey can also be produced efficiently from such fermented milk through the methods to be discussed later.

In the methods of the present invention, the fermenting steps may be followed by conventional stirring. In particular, when the fermentation includes step (B-2) of fermenting under static conditions, it is preferred to stir the fermentation product after termination of the fermentation.

The methods for producing whey containing an ACEI peptide of the present invention include, following the above production of the fermented milk, the step of subjecting the resulting fermented milk to centrifugation and/or filter pressing to separate and recover whey.

The centrifugation of the fermented milk may be carried out in a centrifuge. For example, it is preferred that the centrifugation is carried out continuously at the revolution speed of about 2000 to 10000 rpm. The filter pressing may be carried out in a filter press. It is preferred that the filter pressing is carried out under the pressure of 2 to 8 kg/cm$^2$.

The fermented milk or whey containing an ACEI peptide obtained by the present methods may be used as fermented milk beverage or milk whey beverage. Further, the whey containing an ACEI peptide may be subjected to treatment such as deacidification, desaltation, concentration, isolation, and the like, for preparation of liquid products; or to drying and powdering treatments for preparation of products in the form of granules or tablets.

Since the methods for producing fermented milk containing an ACEI peptide of the present invention include fermentation under stirring, fermented milk with high ACEI peptide content can be produced efficiently. Further, the methods for producing whey containing an ACEI peptide of the present invention include the steps of fermenting under stirring to prepare fermented milk, and subjecting the resulting fermented milk to centrifugation and/or filter pressing to separate and recover whey. Thus, whey with high ACEI peptide content can be recovered efficiently. Therefore, these methods facilitate production of products containing an ACEI peptide, and are remarkably effective in industrial point of view.

EXAMPLES

The present invention will now be explained in detail with reference to Examples and Comparative Examples. However, the present invention is not limited to these.

Comparative Example 1

900 g of powdered skim milk (manufactured by YOTSUBA MILK PRODUCTS CO., LTD.) was dissolved in 9100 g of water, and the resulting solution was subjected to HTST (High Temperature Short Time) pasteurization at 90° C. for 1 minute. The pasteurized solution was cooled down to the room temperature, inoculated with 300 g of precultured *Lactobacillus helveticus* CM4, and stirred to make a uniform mixture. The mixture was then fermented under static conditions at 34° C. for 25 hours, to thereby obtain fermented milk curd (a) in the form of a contiguous gel with the lactic acid acidity of 2.06 wt %.

Next, the obtained fermented milk curd (a) was stirred and then placed in a centrifuge (manufactured by HITACHI LTD., 20PR52), which was operated at 3000 rpm for 10 minutes to remove curd fraction and recover 2.5 kg of whey.

The viscosity and ACEI peptide content of the fermented milk curd (a) were measured under the conditions below. The results are shown in Table 1. Further, the fermented milk curd (a) was stirred, and the particle size of the curd pieces was measured with a particle size analyzer (LA-920 manufactured by HORIBA LTD.). It was found that 90% of the curd pieces had a diameter of not larger than 47 μm, and the arithmetic mean diameter was 27 μm.

Viscosity Measurement

The viscosity was measured with VISMETRON viscometer (manufactured by SHIBAURA SYSTEM CO., LTD.) at the liquid temperature of 25° C., revolution speed of 60 rpm, using rotor No. 2 for medium viscosity. The duration of measurement was 60 seconds.

Measurement of Val-Pro-Pro and Ile-Pro-Pro Contents

About 1 ml of fermented milk curd (a) as it was, was placed in an experimental centrifuge, which was operated at 15000 rpm for 10 minutes to collect the supernatant. 0.3 ml of the obtained supernatant was subjected to adsorption on Sep-Pak Cartridge (manufactured by WATERS CO.), followed by washing with distilled water. The adsorbed material was eluted with 5 ml of methanol, and dried in a centrifuging concentrator under reduced pressure. The obtained dried product was dissolved in 0.3 ml of a 0.05% Trifluoroaceic acid aqueous solution, and analyzed by high performance liquid chromatography (HPLC).

Conditions of Analysis by HPLC
Apparatuses: HITACHI L4000UV DETECTOR (detection at 215 nm)
L6200 Intelligent pump
L5030 Column Oven (35° C.)
Conditions of Isolation: Flow Rate at 0.5 ml/min.
Elution Solvent: 0.3 M NaCl, 0.05% Trifluoroaceic acid aqueous solution
Column: Asahipak GS320 (Φ3.9×600 mm)
ACEI peptide Content: Content of ACEI peptides was calculated by the following formula since Val-Pro-Pro and Ile-Pro-Pro have different ACEI activities:

Content of ACEI peptides(mg/100 g)=Amount of IPP (mg/100 g)×1.7+Amount of VPP(mg/100 g)

Example 1

900 g of powdered skim milk (manufactured by YOTSUBA MILK PRODUCTS CO., LTD.) was dissolved in 9100 g of water, and the resulting solution was subjected to HTST pasteurization at 90° C. for 1 minute. The pasteurized solution was cooled down to the room temperature, inoculated with 300 g of precultured *Lactobacillus helveticus* CM4, and stirred to make a uniform mixture. The mixture was then fermented at 34° C. for 29 hours under stirring at 50 rpm, to thereby obtain fermented milk (b) with the lactic acid acidity of 1.88 wt %. The particle size of the curd pieces in the resulting fermented milk (b) was measured with the particle size analyzer (LA-920 manufactured by HORIBA LTD.). It was found that 90% of the curd pieces had a diameter of not larger than 30 μm, and the arithmetic mean diameter was 18 μm.

Next, the obtained fermented milk (b) was placed in a centrifuge (manufactured by HITACHI LTD., 20PR52), which was operated at 3000 rpm for 10 minutes to remove curd fraction and recover 6 kg of whey.

The viscosity and ACEI peptide content of the fermented milk (b) were measured under the same conditions as in Comparative Example 1. The results are shown in Table 1. Incidentally, the viscosity was measured using rotor No. 1 for low viscosity, for the duration of 30 seconds.

Comparative Example 2

1.5 kg of powdered skim milk (manufactured by YOTSUBA MILK PRODUCTS CO., LTD.) was dissolved in 8.5 kg of water, and the resulting solution was subjected to HTST pasteurization at 90° C. for 1 minute. The pasteurized solution was cooled down to the room temperature, inoculated with 300 g of precultured *Lactobacillus helveticus* CM4, and stirred to make a uniform mixture. The mixture was then fermented under static conditions at 34° C. for 28 hours, to thereby obtain fermented milk curd (c) in the form of a contiguous gel with the lactic acid acidity of 2.81 wt %.

Next, the obtained fermented milk curd (c) was stirred and then placed in a centrifuge (manufactured by HITACHI LTD., 20PR52), which was operated at 3000 rpm for 10 minutes to remove curd fraction and recover 100 g of whey.

The viscosity and ACEI peptide content of the fermented milk curd (c) were measured under the same conditions as in Comparative Example 1. The results are shown in Table 1. Incidentally, the viscosity was measured using rotor No. 3 for high viscosity, for the duration of 60 seconds. The viscosity and ACEI peptide content of the fermented milk curd (c) were measured under the conditions below.

Example 2

1.5 kg of powdered skim milk (manufactured by YOTSUBA MILK PRODUCTS CO., LTD.) was dissolved in 8.5 kg of water, and the resulting solution was subjected to HTST pasteurization at 90° C. for 1 minute. The pasteurized solution was cooled down to the room temperature, inoculated with 300 g of precultured *Lactobacillus helveticus* CM4, and stirred to make a uniform mixture. The mixture was then fermented at 34° C. for 30 hours under stirring at 50 rpm, to thereby obtain fermented milk (d) with the lactic acid acidity of 3.04 wt %.

Next, the obtained fermented milk (d) was placed in a centrifuge (manufactured by HITACHI LTD., 20PR52), which was operated at 3000 rpm for 10 minutes to remove curd fraction and recover 6.4 kg of whey.

The viscosity and ACEI peptide content of the fermented milk (d) were measured under the same conditions as in Comparative Example 1. The results are shown in Table 1. Incidentally, the viscosity was measured using rotor No. 1 for low viscosity, for the duration of 30 seconds.

Example 3

712 kg of powdered skim milk (manufactured by YOTSUBA MILK PRODUCTS CO., LTD.) was dissolved in 7288 kg of water, and the resulting solution was subjected to plate pasteurization at 92° C. and then introduced into a tank (18000 liter tank manufactured by IWAI KIKAI). The pasteurized solution was cooled down to 35° C., inoculated with 240 kg of precultured *Lactobacillus helveticus* CM4, and stirred to make a uniform mixture. The mixture was then fermented at 32° C. for 27 hours under intermittent stirring at 50 rpm (by repeating cycles of stirring for 15 minutes and leaving to stand for 45 minutes), to thereby obtain fermented milk (e) with the lactic acid acidity of 1.8 wt %. The particle size of the curd pieces in the resulting fermented milk (e) was measured with the particle size analyzer (LA-920 manufactured by HORIBA LTD.). It was found that 90% of the curd pieces had a diameter of not larger than 172 μm, and the arithmetic mean diameter was 86 μm.

Next, the obtained fermented milk (e) was placed in a nozzle separator (MBUX510T-34C manufactured by ALFA-LAVAL, nozzle size 1 mm, flow rate 3500 litter per hour), which was operated at 7490 rpm to recover 6160 kg of whey.

The viscosity and ACEI peptide content of the fermented milk (e) were measured under the same conditions as in Comparative Example 1. The results are shown in Table 1. Incidentally, the viscosity was measured using rotor No. 1 for low viscosity for the duration of 30 seconds.

TABLE 1

| Fermented Milk | Viscosity (cp) | Whey Recovery (%) | ACEI Peptide Content (mg/100 g) |
| --- | --- | --- | --- |
| Fermented Milk (a) (Comparative Example 1) | 415 | 25 | 7.1 |
| Fermented Milk (b) (Example 1) | 4.5 | 60 | 9.0 |
| Fermented Milk (c) (Comparative Example 2) | 1832 | 1 | 10.5 |

TABLE 1-continued

| Fermented Milk | Viscosity (cp) | Whey Recovery (%) | ACEI Peptide Content (mg/100 g) |
|---|---|---|---|
| Fermented Milk (d) (Example 2) | 8.1 | 64 | 10.8 |
| Fermented Milk (e) (Example 3) | 3.8 | 77 | 8.6 |

What is claimed is:

1. A method for recovering whey with a high content of angiotensin converting enzyme inhibitory peptide from fermented milk, comprising:
   (A) preparing a mixture of lactic acid bacteria comprising *Lactobacillus helveticus* and a starting material containing milk;
   (B) fermenting said mixture while stirring at least during the period when the pH of the mixture is lowered from 5 to 4.6, so that curd pieces and whey are generated; and
   (C) recovering said whey from said mixture at a recovery of 60 to 77% by at least one of centrifugation at a revolution speed of 2000 to 10000 rpm and filter pressing under pressure of 2 to 8 kg/cm².

2. The method of claim 1, wherein said stirring in step (B) is carried out at a stirring speed of 1 to 50 rpm.

3. The method of claim 1 further comprising an additional step of:
   (B) fermenting said mixture under static conditions.

4. The method of claim 1, wherein said milk is selected from the group consisting of cow's milk, goat's milk, sheep's milk, soy bean milk, skim milk, reconstituted milk, powdered milk, condensed milk, and mixtures thereof.

5. The method of claim 1, wherein said mixture after fermentation has a viscosity of not higher than 20 cp.

6. The method of claim 1, wherein said angiotensin converting enzyme inhibitory peptide is selected from the group consisting of Val-Pro-Pro, Ile-Pro-Pro, and mixtures thereof.

7. The method of claim 1, wherein said mixture further contains a yeast.

8. The method of claim 1, wherein said *Lactobacillus helveticus* comprises *Lactobacillus helveticus* CM4 (NATIONAL INSTITUTE OF BIOSCIENCE AND HUMAN TECHNOLOGY, AGENCY OF INDUSTRIAL SCIENCE AND TECHNOLOGY, Deposit No. FERM BP-6060, Deposit date: Aug. 15, 1997).

* * * * *